(12) United States Patent
Herrmann

(10) Patent No.: US 9,394,115 B2
(45) Date of Patent: Jul. 19, 2016

(54) DYNAMIC RECONFIGURABLE IN-LINE INVERTING AND BYPASS SYSTEM

(71) Applicant: Douglas K Herrmann, Webster, NY (US)

(72) Inventor: Douglas K Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 27 days.

(21) Appl. No.: 13/621,298

(22) Filed: Sep. 17, 2012

(65) Prior Publication Data

US 2014/0076690 A1 Mar. 20, 2014

(51) Int. Cl.
*B65H 29/00* (2006.01)
*B65G 47/248* (2006.01)

(52) U.S. Cl.
CPC .................. *B65G 47/248* (2013.01)

(58) Field of Classification Search
CPC .. B65H 9/002; B65H 15/00; B65H 2301/332; B65H 2301/33212; B65H 2301/33214; B65H 2301/33216; B65H 2301/3322; B65H 2301/33222; B65H 2301/33224; B65H 2301/333; B65H 2301/33314; B65H 2301/34232; B65H 2301/36; B65H 2301/36132; B65H 2301/3421; B65H 2301/3422; B65H 2301/3423; B65H 2301/34112; B65H 2301/3412; B65H 2301/342
USPC ........... 271/2, 225, 65, 184, 185, 186, 271/272–274, 314; 198/405, 626.1–626.6, 198/839
See application file for complete search history.

(56) References Cited

U.S. PATENT DOCUMENTS

| | | | | |
|---|---|---|---|---|
| 2,929,489 | A * | 3/1960 | Parrish | 198/405 |
| 3,685,471 | A * | 8/1972 | Reynolds | 112/470.36 |
| 4,575,729 | A * | 3/1986 | Ayers et al. | 347/49 |
| 4,705,157 | A * | 11/1987 | Bowles | 198/405 |
| 6,626,103 | B2 | 9/2003 | Neumann | |
| 6,823,981 | B2 * | 11/2004 | Ogle et al. | 198/417 |
| 7,198,262 | B2 * | 4/2007 | Hartl et al. | 271/2 |
| 8,087,773 | B2 | 1/2012 | Bober et al. | |
| 2005/0167903 | A1 * | 8/2005 | Hartl et al. | 271/2 |
| 2009/0278906 | A1 * | 11/2009 | Yajima et al. | 347/104 |
| 2010/0213029 | A1 * | 8/2010 | Ponti | 198/405 |

* cited by examiner

*Primary Examiner* — Thomas Morrison

(57) ABSTRACT

A two belt inverter includes an integrated drive system that reorients the belts (via rotation) to both invert sheets and quickly reorients the belts (via rotation) to an in-line bypass configuration from job to job.

16 Claims, 6 Drawing Sheets

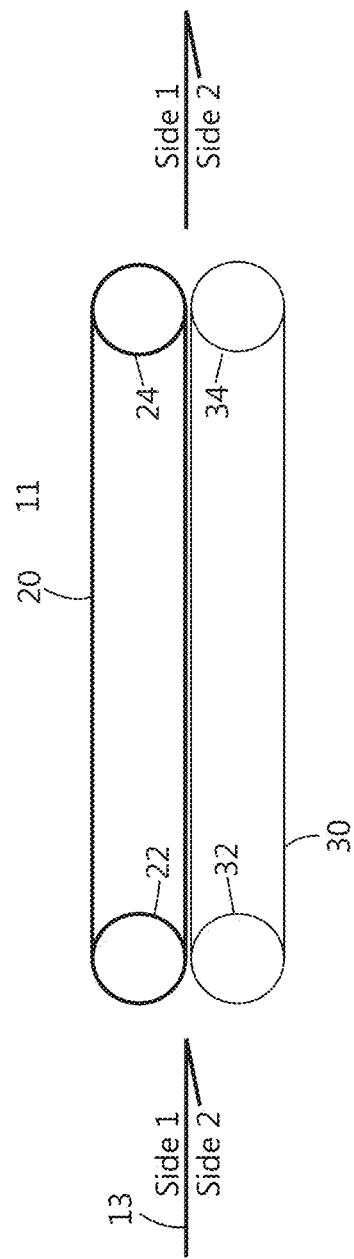

DYNAMIC RECONFIGURABLE IN-LINE INVERTING AND BYPASS SYSTEM

The present disclosure relates to a media handling system, and more particularly, to an inverter apparatus that quickly inverts media for printing onto opposite sides of the media.

BACKGROUND

Ordinarily, printed return address system design 100, as shown for example in prior art FIG. 5, incorporates an in-line vacuum belt feed system 110 that feeds media to receive image thereon. The system utilizes multiple friction retard feeders 120, 122, 124, and 126 dedicated to feeding blank envelopes onto the in-line vacuum belt system 110 for feeding into a high speed ink jet printer that includes ink jet print head 130. The envelopes are then fed through an ultraviolet curing station 140, quality assurance station 150 and then for removal at a subsequent station. In order to limit the number of feeders required, but allow for the option of printing on either side of the envelopes, it is best to set up the feeders once to feed the envelopes in one orientation either face up or face down, as opposed to, a time consuming set-up of each feeder and adjust for each particular media as is presently required. The system will then take these envelopes and print either on the face side or flap side depending on the job. To increase throughput and to reduce operator setup errors, the system downstream of the feeders must be able present either the face or flap side to the printer depending on the job requirement without operator intervention. To meet the high thru-put requirements, the system needs to be able to do this reconfiguration on the fly between job runs and it must be able to invert and transport at high speeds.

SUMMARY

With the high speed, high cost and space requirements of some current ink jet printers, it is necessary to present, for example, envelopes both face-up and face-down to print either the flap or the face depending on the job. This requires a high speed dynamic inverter that is also capable of a non-invert bypass function.

Due to speeds increasing in media handling systems, inversion options are more limited because the inter-copy gap and associated timing between each piece of media (sheet, card, envelope) becomes increasingly small thereby eliminating traditional nip drive and baffle inverters. This is especially an issue when having to divert media to a bypass path to allow for printing on either side of the media. To address inverting in high speed applications such as production mailing inserters, the designs make use of in-line high speed inversion methods that eliminate the need to stop and start the sheet during the inversion process. One way that is used is a dual belt in-line inverter.

These have been applied in the inserter industry to flip stuffed envelopes to reorient the envelopes after loading to present the face side for printing the indicia. These belts have also been incorporated in slower printing systems such as shown in U.S. Pat. No. 6,626,103 B2 which in incorporated herein along with the references cited therein to the extent necessary to practice the present disclosure.

Although the "twisted" dual belt systems are known for providing a method to invert the media, they do not provide for the dynamic reconfiguration to a bypass belt transport to allow for a dynamic and reconfigurable non-inverting option.

Accordingly, an improved two belt inverter system is disclosed that addresses both the problem of high speed in-line inverting, as well as, the ability to dynamically reconfigure the system to provide for both an in-line belt drive bypass and in-line inverting. The two belt inverter system includes an integrated drive system that reorients the belts through rotation to both invert the media and quickly reorient, by counter rotation, the same system to an in-line bypass from job to job. This pivoting drive system that can reorient the belt configuration, enables the two belt unit to transport card/envelopes or other media at high speeds while providing the ability to print either side of the media with one print head real time with no manual setups between jobs (i.e., no manual orienting of the media in a feeder tray to print on a specific side).

BRIEF DESCRIPTION OF THE DRAWINGS

Various of the above-mentioned and further features and advantages will be apparent to those skilled in the art from the specific apparatus and its operation or methods described in the example(s) below, and the claims. Thus, they will be better understood from this description of these specific embodiment(s), including the drawing figures (which are approximately to scale) wherein:

FIG. 2A is a partial, schematic frontal view of the in-line inverter of the present disclosure showing an envelope being bypassed from the inverting of FIG. 1A for printing onto its face side;

DETAILED DESCRIPTION

Figure 1A:
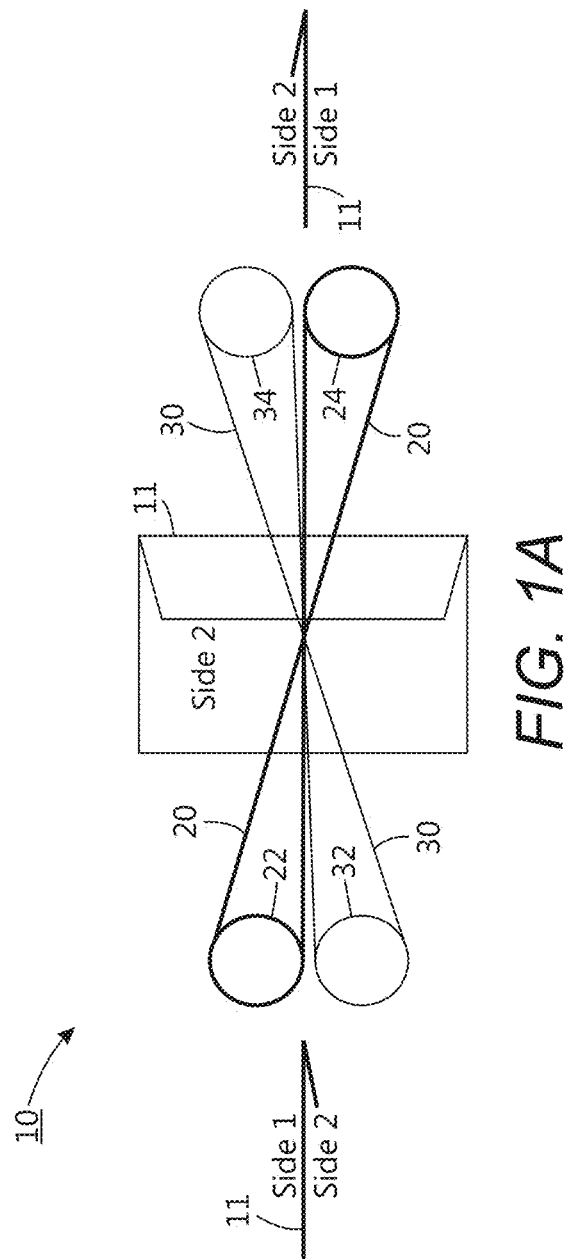
FIG. 1A is a partial, schematic frontal view of a duplexing configuration of the in-line inverter of the present disclosure showing an envelope being inverted for printing onto its flap side.

An in-line inverter system 10 is disclosed in FIGS. 1A-4B in accordance with the present disclosure that uses a two belt inverter with an integrated pivoting drive system that reorients the belts to both invert media and dynamically reconfigure the same system to an in-line bypass from job to job. The inverter system 10 is positioned between feeder 126 and print head 130. FIG. 1A, in particular, shows an envelope 11 which could be from feeder 126 side 1 (front side) up and sided 2 (flap side) along conveyor 110 of FIG. 1 into the two belt inverter system 10 that inverts the envelope and feeds it now with side 1 down and side 2 up towards a conventional ink jet print head 130 which can be of the type shown in U.S. Pat. No. 8,087,773 which is incorporated herein by reference. Inverter 10 includes belt 20 mounted over idler roller 22 and idler roller 24 while belt 30 is mounted over idler roller 32 and idler roller 34.

Figure 1B:
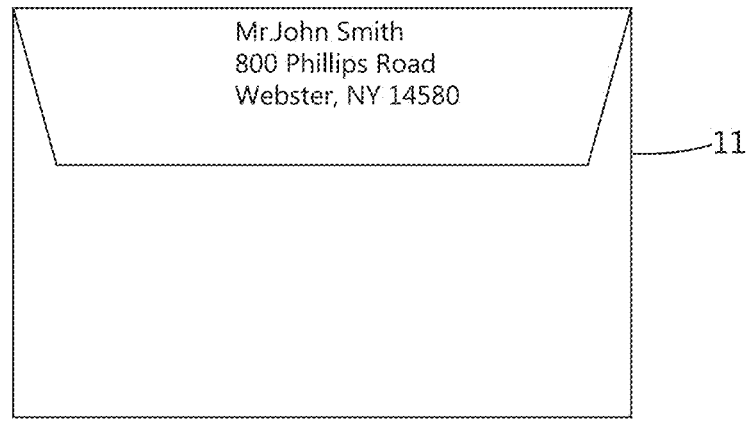
FIG. 1B is a partial, schematic frontal view of the envelope of FIG. 1A after an address has been printed on its flap side.
Figure 2B:
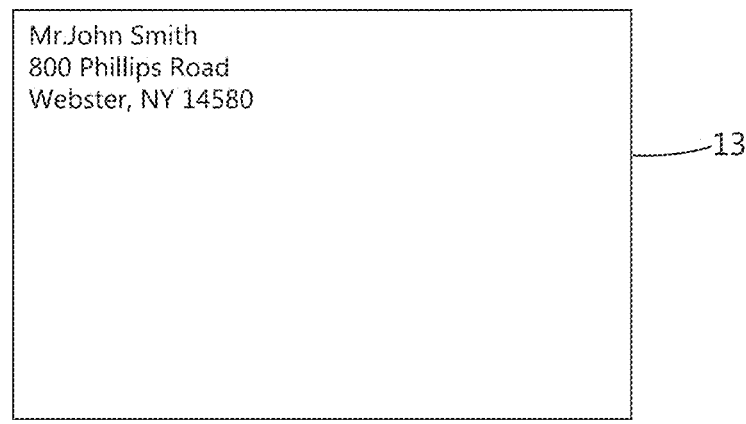
FIG. 2B is a partial, schematic frontal view of the envelope of FIG. 2A after an address has been printed on its face side.
Figure 3A:
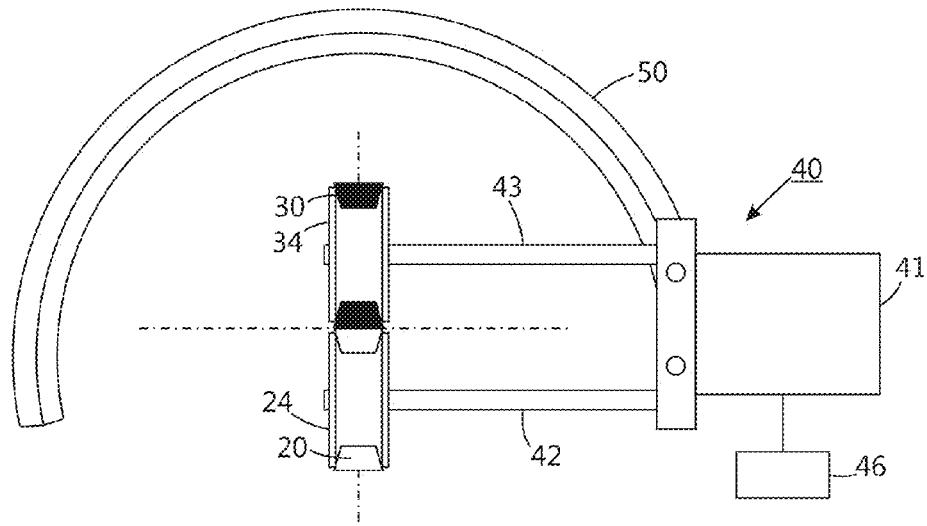
FIG. 3A is a partial, schematic end view of the duplexing configuration of FIG. 1 showing its pivot drive system.
Figure 3B:
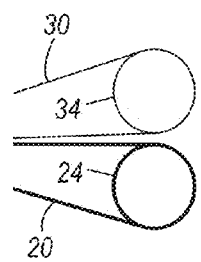
FIG. 3B is a partial, schematic frontal view showing the position of an idler belt nip in the duplexing configuration of FIG. 3A.
Figure 4A:
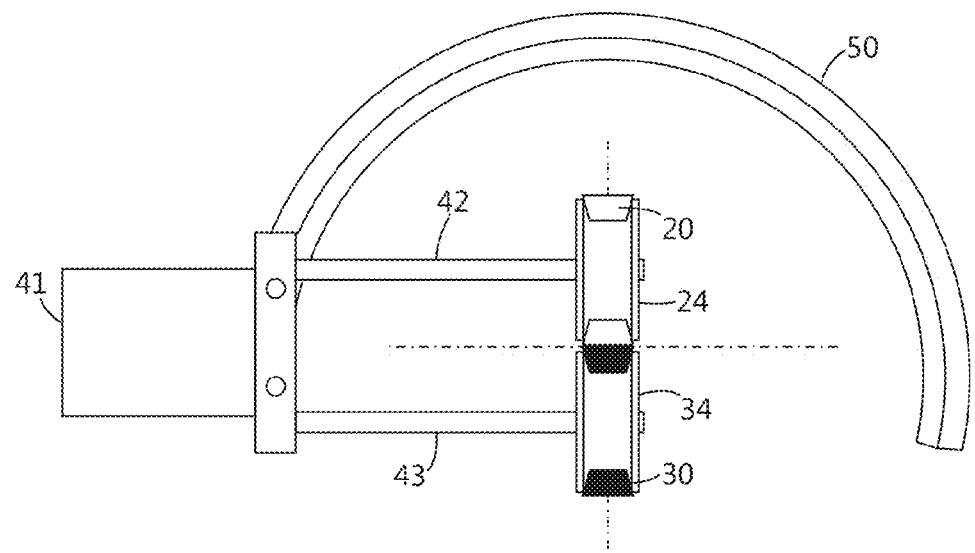
FIG. 4A is a partial, schematic end view showing the dual belts of FIG. 2A the pivot drive system in a simplexing configuration.
Figure 4B:
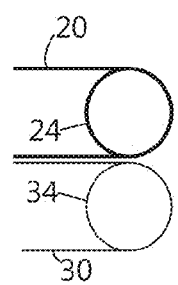
FIG. 4B is a partial, schematic frontal view showing the position of an idler belt nip in the simplexing configuration of FIG. 4A.
Figure 5:
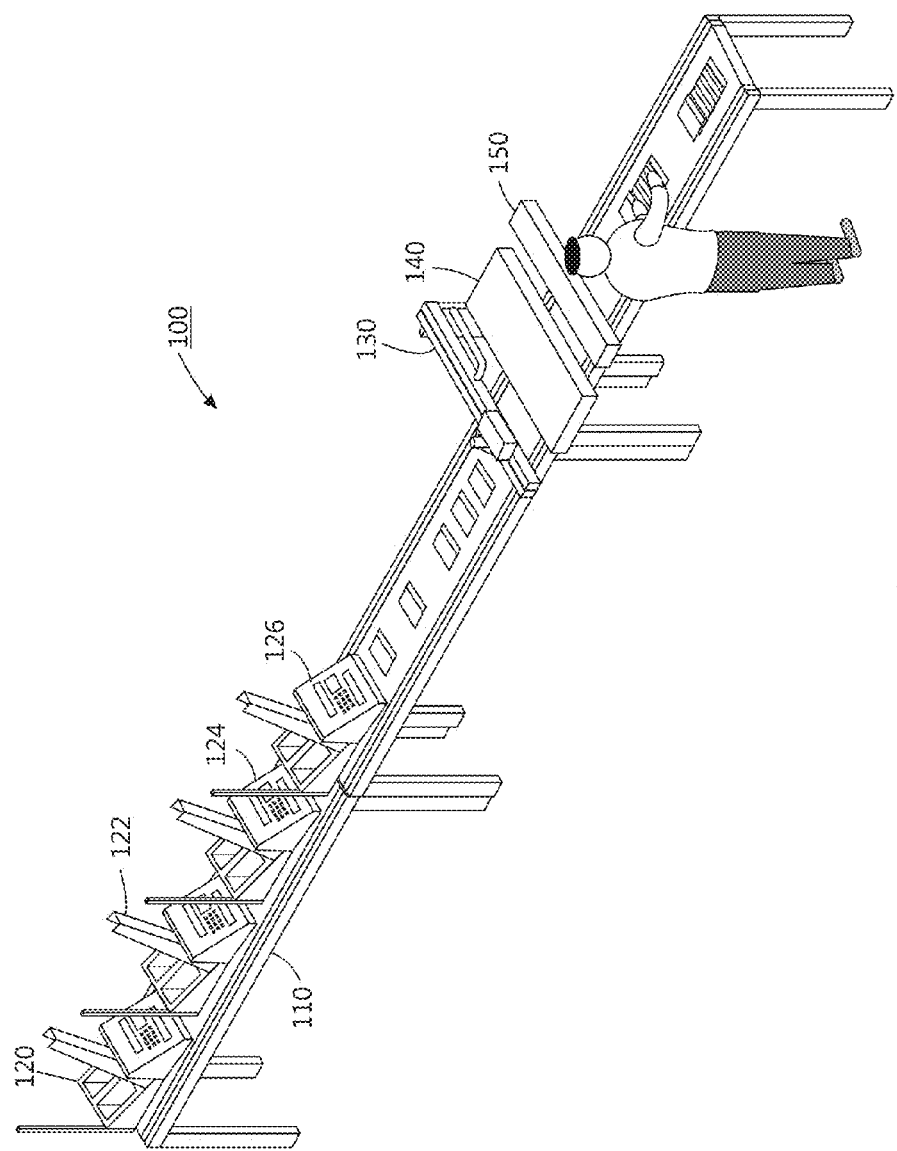
FIG. 5 is a partial, schematic perspective view of a prior art configuration of an in-line feeder system that feeds envelopes for printing onto either the flap side or non-flap side by employing multiple feed trays.

When inversion of a set of envelopes is desired as shown in FIG. 1A, previously programmed controller 46 of pivot motion drive system or mechanism 40 in FIGS. 3A and 3B sends a signal to drive motor 41 which then moves through a pivot drive system guide path that includes radial track 50 from home or bypass (non-invert) position in FIGS. 4A and 4B to an inverting position shown in FIGS. 3A and 3B. Idler belt pulley shafts 42 and 43 are connected to idler rollers 24 and 34, respectively, and to motor 41, such that, rotational movement of motor 41 though radial track 50 will cause one end of idler belts 20 and 30 to twist into the configuration shown in FIGS. 1A and 3B. Because of this configuring of belts 20 and 30, envelope 11 held between the belts is inverter by 180°, so that after inversion, the original position of idler rollers 24 and 34 in FIG. 2A is exchanged and the previous bottom is situated on the top. Inverted envelope 11 is shown in FIG. 1B after having exited printer 14 with a printed return address on side 2 or the flap side thereof.

Pivot drive mechanism 40 specifically allows for the reconfiguration from inverted/reverted to bypass by maintaining the belt alignment throughout the pivoting motion. The pivot drive mechanism moves along radial track 50 and maintains the nip center point between idler rollers 24 and 34 during the pivoting motion. This ensures that the belt alignment is maintained for both the inversion and bypass modes.

A bypass configuration showing envelope 13 being bypassed from inversion to print on side 1 (face side) is shown in FIG. 2A. In order to accomplish non-inversion of envelope 13 in FIG. 2A, pivot motion drive system 40 is in the position shown in FIGS. 4A and 4B with belt 20 on top of and in parallel with belt 30. Motor 41 is now in its original position to the left of idler rollers 24 and 34. In practice, an envelope is feed from feeder 12 into and passes through inverter system 10 without inversion taking place since idler rollers 24 and 34 have not been rotated to twist belts 20 and 30. The envelope exits inverter system 10 and enters ink jet printer 14 which prints onto side 1 of the envelope as shown in FIG. 2B.

In recapitulation, a two belt inverter with an integrated pivoting drive system that reorients the belts to both invert sheets and dynamically reconfigure into an in-line bypass configuration as individual jobs require is disclosed. By incorporating the pivoting drive system to reorient the belt configuration, the two belt system can be used to transport cards/envelopes or other media at high speeds while providing the ability to print on either side of the cards/envelopes with one print head on-the-fly with no manual setups between jobs.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A multi-mode in-line media conveying system adapted to invert media when in one mode and bypass media inversion when in another mode of operation, comprising:
   a first bypass mode wherein a first idler pulley includes a first idler belt supported by a first pair of spaced apart shaft mounted idler rollers and a second idler pulley that includes a second idler belt supported by a second pair of spaced apart shaft mounted idler rollers, said first idler belt being configured in a horizontal plane and positioned in endless, non-twisted, superimposed and parallel relationship to said second idler belt such that media passed between said first and second idler belts is conveyed in a horizontal plane from an entrance point of said multi-mode in-line media conveying system through an exit point of said multi-mode in-line media conveying system thereby bypasses inversion; and
   a second inverting mode wherein a pivot motion drive mechanism connected to one of said first pair of shaft mounted idler rollers and one of said second pair of shaft mounted idler rollers is actuated in order to pivot said first and second idler belts into a second position causing twisting of said first and second idler belts into a second position to thereby invert media passed from said entrance point of said multi-mode in-line media inverting and bypass system before reaching said exit point of said multi-mode in-line media conveying system.

2. The system of claim 1, wherein said pivot motion drive mechanism includes a motor.

3. The system of claim 2, wherein said motor is pivoted along a radial track.

4. The system of claim 1, wherein said one of said first pair of shaft mounted idler rollers and said one of said second pair of shaft mounted idler rollers form a nip, and wherein a center point of said nip is maintained during pivoting of said pivot motion drive mechanism to thereby ensure that belt alignment is maintained for both said first and second modes of operation.

5. The system of claim 4, including a controller adapted to control said first and second modes of said pivot motion drive mechanism from job to job.

6. The system of claim 1, wherein said system is incorporated into an ink jet printer.

7. The system of claim 6 including at least one feeder for feeding media into said pivot motion drive mechanism.

8. A high speed ink jet printer employing a dual mode media printed return address system, comprising;
   an inverter, said inverter including two belts supported at opposite ends between two shafts, respectively, said inverter being adapted when in a first mode to position said two belts in a first and inversion bypass position to allow media to pass into said inverter and through an exit point of said inverter without inversion and when said inverter is in a second mode said two belts are in a second and invert position that inverts media passing therethrough 180°; and
   an integrated drive system connected to said inverter, said integrated drive system being adapted to rotate said shafts at an end of said two belts in order to twist said two belts relative to each other into said invert position when inversion is required and dynamically return said two belts to said inversion bypass position when inversion is not required.

9. The printer of claim 8, wherein said integrated drive system includes a pivot mechanism adapted to rotate said two first and second belts between said invert and bypass positions.

10. The printer of claim 9, wherein said pivot mechanism is mounted on a radial track.

11. The printer of claim 10, wherein said two belts are each supported in superimposed relation by shaft mounted idler rollers, and wherein at least one idler of each of said two belts forms a nip therebetween, and wherein said pivot mechanism is adapted to twist said idler rollers forming said nip when inversion of media is required.

12. The printer of claim 11, wherein said pivot mechanism is adapted to return said idler rollers forming said nip to their original position when media bypass without inversion is required.

13. The printer of claim 12, including a controller for controlling movement of said pivot mechanism.

14. The printer of claim 13, wherein said media includes envelopes.

15. A method for high speed, on-the-fly, inverting of media, comprising;

providing first and second belts having first ends and second opposite ends supported in a non-twisted, superimposed and parallel first position by idler rollers such that when said first and second belts are in said first position said media passing therethrough is allowed to pass into, between and exit from said first and second belts without inversion and when said first and second belts are in a second position said first ends of said first and second belts are twisted 180° relative to said second opposite ends of said first and second belts such that said media passing into and out of said first and second belts is inverted; and providing an integrated drive system connected to said first and second belts, said integrated drive system being adapted to twist said first and second belts 180° from an inversion bypass position into an invert position when inversion is required, said integrated drive system including a pivot mechanism having a radial track and adapted to rotate said first and second belts between said invert and bypass positions with use of said radial track;

providing a motor operatively connected to said first and second belts; and providing a controller connected to said motor, said controller being adapted to actuate said motor and thereby rotate and twist said first and second belts through said integrated drive system when inverting of said media is required and return said first and second belts to said first non-twisted position after inverting is no longer required.

16. The method of claim 15, wherein said media is flipped 180° from an original horizontal position.

* * * * *